United States Patent
Osakabe et al.

(10) Patent No.: US 9,457,973 B2
(45) Date of Patent: Oct. 4, 2016

(54) SHEET FEEDER, IMAGE SCANNER PROVIDED WITH THE SHEET FEEDER, AND PRINTER PROVIDED WITH THE IMAGE SCANNER

(71) Applicants: Yoshinori Osakabe, Seto (JP); Takayuki Akimatsu, Aichi (JP)

(72) Inventors: Yoshinori Osakabe, Seto (JP); Takayuki Akimatsu, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 32 days.

(21) Appl. No.: 13/933,996

(22) Filed: Jul. 2, 2013

(65) Prior Publication Data
US 2013/0293938 A1 Nov. 7, 2013

Related U.S. Application Data

(63) Continuation of application No. 12/486,408, filed on Jun. 17, 2009, now Pat. No. 8,496,241.

(30) Foreign Application Priority Data
Jun. 20, 2008 (JP) .................................. 2008-162298

(51) Int. Cl.
 B65H 3/52 (2006.01)
 B65H 3/56 (2006.01)
 H04N 1/00 (2006.01)

(52) U.S. Cl.
 CPC .......... *B65H 3/5215* (2013.01); *B65H 3/5223* (2013.01); *B65H 3/56* (2013.01); *H04N 1/00628* (2013.01); *B65H 2402/5441* (2013.01); *B65H 2403/721* (2013.01)

(58) Field of Classification Search
 CPC ............ B65H 1/00; B65H 1/04; B65H 1/06; B65H 3/00; B65H 3/06; B65H 3/52; B65H 3/5207; B65H 3/5215; B65H 3/5223; B65H 3/523; B65H 3/5238; B65H 3/54; B65H 2405/113; B65H 2405/1136; B65H 3/56; B65H 2402/5441; H04N 1/00628
 USPC .................................. 271/121, 123, 124, 167
See application file for complete search history.

(56) References Cited

U.S. PATENT DOCUMENTS 5,052,676 A * 10/1991 Shiina et al. .................. 271/121
5,058,877 A * 10/1991 Fujiwara ............... B65H 3/5223
 271/124

(Continued)

FOREIGN PATENT DOCUMENTS

GB 2242415 A 10/1991
JP S59-159651 U 10/1984

(Continued)

OTHER PUBLICATIONS

Japan Patent Office; Notification of Reasons of Rejection in Japanese Patent Application No. 2008-162298 (related to the above-captioned U.S. Appl. No.) mailed on Jun. 2, 2010.

(Continued)

*Primary Examiner* — Prasad Gokhale
(74) *Attorney, Agent, or Firm* — Baker Botts L.L.P.

(57) ABSTRACT

A sheet feeder includes a separation roller having a circumferential surface that contacts a first sheet to be fed first among stacked sheets and picks up the first sheet and one or more second sheets adjacent to the first sheet, a separation arm that is closer to the circumferential surface of the separation roller downstream in a feeding direction and configured to apply higher frictional resistance to the second sheets than the first sheet to feed the first sheet ahead of the second sheets, and a guide member including a guide portion that has a lower-friction surface than the separation arm and extends from the separation arm with a distal end thereof in contact with or close to the circumferential surface of the separation roller. The guide portion guides the first and second sheets along the circumferential surface of the separation roller.

9 Claims, 13 Drawing Sheets

(56) References Cited

U.S. PATENT DOCUMENTS

| | | | | |
|---|---|---|---|---|
| 5,195,738 | A | * | 3/1993 | Gysling .................... 271/111 |
| 5,277,416 | A | * | 1/1994 | Kim .................... B65H 3/06 |
| | | | | 271/119 |
| 5,277,417 | A | | 1/1994 | Moritake et al. |
| 5,570,876 | A | * | 11/1996 | Samii ..................... 271/119 |
| 5,573,338 | A | * | 11/1996 | Morikawa ........... B65H 3/5238 |
| | | | | 271/109 |
| 5,584,475 | A | * | 12/1996 | Asada ................. B65H 3/5223 |
| | | | | 271/121 |
| 6,010,126 | A | | 1/2000 | Mou et al. |
| 6,017,031 | A | | 1/2000 | Oosawa et al. |
| 6,025,936 | A | | 2/2000 | Ishida |
| 6,371,477 | B1 | * | 4/2002 | Lin ..................... B65H 3/5223 |
| | | | | 271/121 |
| 6,390,463 | B1 | * | 5/2002 | Iwago ..................... 271/118 |
| 6,485,014 | B1 | * | 11/2002 | Lin ..................... B65H 3/5223 |
| | | | | 221/167 |
| 6,550,761 | B1 | * | 4/2003 | Chiang .................... B65H 3/34 |
| | | | | 271/104 |
| 7,128,316 | B2 | * | 10/2006 | Nakano ............... B65H 3/0638 |
| | | | | 271/109 |
| 7,841,592 | B2 | * | 11/2010 | Wu ..................... B65H 3/5238 |
| | | | | 271/121 |
| 7,845,630 | B2 | * | 12/2010 | Hung et al. ................ 271/121 |
| 2002/0135120 | A1 | | 9/2002 | De Koning et al. |
| 2003/0085507 | A1 | * | 5/2003 | Chiang .................... B65H 3/34 |
| | | | | 271/121 |
| 2004/0169326 | A1 | * | 9/2004 | Nakano ............... B65H 3/0638 |
| | | | | 271/121 |
| 2005/0200071 | A1 | * | 9/2005 | Ikeda .................... 271/121 |
| 2006/0012109 | A1 | | 1/2006 | Chiang |
| 2006/0113721 | A1 | | 6/2006 | Kim |
| 2006/0255526 | A1 | | 11/2006 | Ginzton |
| 2008/0224386 | A1 | * | 9/2008 | Kunieda .................... B42C 1/12 |
| | | | | 271/226 |
| 2009/0256306 | A1 | * | 10/2009 | Wu ..................... B65H 3/5238 |
| | | | | 271/121 |
| 2012/0080836 | A1 | * | 4/2012 | Morisaki .............. B65H 3/5223 |
| | | | | 271/121 |

FOREIGN PATENT DOCUMENTS

| | | | | |
|---|---|---|---|---|
| JP | S64-040652 | U | | 3/1989 |
| JP | 02089731 | A | * | 3/1990 |
| JP | H02-089731 | A | | 3/1990 |
| JP | H02-286534 | A | | 11/1990 |
| JP | 03158335 | A | * | 7/1991 |
| JP | 04101939 | A | * | 4/1992 |
| JP | H04-058541 | U | | 5/1992 |
| JP | H04-313532 | A | | 11/1992 |
| JP | 04350034 | A | * | 12/1992 |
| JP | H05-238572 | A | | 9/1993 |
| JP | H06-227693 | A | | 8/1994 |
| JP | H07-257769 | A | | 10/1995 |
| JP | H09-086713 | A | | 3/1997 |
| JP | H09-309638 | A | | 12/1997 |
| JP | 2003-146462 | A | | 5/2003 |
| JP | 3567609 | B2 | | 9/2004 |

OTHER PUBLICATIONS

Japan Patent Office; Notification of Reasons for Rejection in Japanese Patent Application No. 2008-162298 (related to the above-captioned U.S. Appl. No.) mailed on Sep. 8, 2010.

Japan Patent Office, Decision of Rejection for Patent Application No. JP 2008-162298 (related to above-captioned patent application), mailed Dec. 22, 2010.

Japan Patent Office, Decision for Dismissal of an Amendment for Patent Application No. JP 2008-162298 (related to above-captioned patent application), mailed Dec. 22, 2010.

The State Intellectual Property Office of the People's Republic of China; Notification of First Office Action for Application No. CN2009-10146205.X (related to above-captioned U.S. Appl. No.), dated Oct. 11, 2010.

* cited by examiner

SHEET FEEDER, IMAGE SCANNER PROVIDED WITH THE SHEET FEEDER, AND PRINTER PROVIDED WITH THE IMAGE SCANNER

CROSS-REFERENCE TO RELATED APPLICATION

This application is a continuation application of U.S. patent application Ser. No. 12/486,408, which was filed on Jun. 17, 2009, which claims priority under 35 U.S.C. §119 from Japanese Patent Application No. 2008-162298 filed on Jun. 20, 2008. The entire subject matter of the applications are incorporated herein by reference.

BACKGROUND

1. Technical Field

The following description relates to one or more sheet feeders configured to feed sheets separately on a sheet-by-sheet basis and smoothly to a scanner unit or a printer unit.

2. Related Art

As a sheet feeder, employed for an image scanner or a printer, which is configured to feed sheets stacked on a feed tray to a scanner unit or a printer unit separately on a sheet-by-sheet basis, Japanese Utility Model Provisional Publication No. SHO59-159651 discloses an Automatic Document Feeder (ADF) that includes a feed tray configured to be loaded with plural document sheets thereon, a feed roller (a separation roller) that is provided at a downstream side in a sheet feeding direction relative to the feed tray and configured to rotate in the sheet feeding direction, a high-friction discrimination arm configured to contact the feed roller, a low-friction film that is provided on a side of a contact surface between the discrimination arm and the feed roller and formed to become narrower in the sheet feeding direction, and an urging member configured to urge the discrimination arm toward the feed roller.

In the above configuration, now the following situation is assumed: easily-bendable document sheets are stacked high on the feed tray and a leading end of a sheet among the stack of document sheets that is at the closest level to a circumferential surface of the feed roller is fed in a tangential direction of the circumferential surface of the feed roller and then conveyed toward a surface of the discrimination arm. In this situation, when the film is short and a leading end thereof is far at an upstream side in the sheet feeding direction away from a nipping point between the feed roller and the discrimination arm, the leading end of the document sheet cannot establish sliding contact with a surface of the film at a small angle. Consequently, the leading end of the document sheet collides directly against the high-friction surface of the discrimination arm at an angle as large as 60 degrees. It results in great resistance to feeding the leading end of the document sheet in the sheet feeding direction. Nevertheless, a portion of the document sheet on an upstream side in the sheet feeding direction relative to the leading end thereof is forced to be fed to the downstream side by the circumferential surface of the feed roller. Therefore, the upstream-side portion of the sheet is reformed in a curled shape. A range in which the reformation of the sheet into a curled shape is caused corresponds substantially to a width of the discrimination arm (i.e., a length of the discrimination arm in a direction parallel to a surface of the sheet and perpendicular to the sheet feeding direction). Thus, the reformation of the sheet is regarded as a kind of buckling.

On the contrary, when the leading end of the film is extended close to the nipping point between the feed roller and the discrimination arm, an effective high-friction area on the surface of the discrimination arm is reduced. Consequently, the reformation of the sheet into a curled shape is hardly caused. However, when the leading end of the film reaches the nipping point, an operation of separating sheets cannot be achieved between the feed roller and the discrimination arm, and it results in multiple-sheet feeding. Nonetheless, a positional relationship between the feed roller and the discrimination arm that may vary within a production tolerance unfortunately makes it difficult to locate the leading end of the film in an appropriate position.

Japanese Patent Provisional Publication No. HEI6-227693 (see FIGS. 1 to 6 in the Publication) discloses a sheet feeder that includes, at an end on a sheet feeding side, a rubber feed roller driven to rotate and a high-friction separation arm configured to contact an upper circumferential surface of the feed roller. The sheet feeder further includes a metal plate regulator disposed such that a distal end thereof presses a portion, of a back surface of the separation arm, near a nipping point between the separation arm and an upper circumferential surface of the feed roller. Thus, a gap between the feed roller and the separation arm is regulated to a distance such that a single sheet passes therethrough.

Further, the sheet feeder includes lower spring members disposed at both sides in a width direction of the separation arm. Bases of the lower spring members formed from metal plates are fixed to a bracket together with the separation arm. The bases of the lower spring members are fixed to a surface of the separation arm that faces the circumferential surface of the feed roller. Furthermore, free ends of the lower spring members are extended up to such a position, at an upstream side in the sheet feeding direction relative to the nipping point, as to nearly contact the upper circumferential surface of the feed roller. In this configuration, sheets of a stack of sheets on a feed tray are inserted into between the upper circumferential surface of the feed roller and the lower spring members in an overlapping state. At this time, the multiple-sheet feeding can allegedly be prevented by such an operation that a sheet, which is in contact with the upper circumferential surface of the feed roller, proceeds ahead of a sheet which is receiving high frictional resistance while contacting the separation arm. The configuration has a problem that the number of sheets settable on the feed tray is limited to as many as ten.

On the other hand, Japanese Patent Publication No. 3567609 (hereinafter, simply referred to as '609 Publication) (see FIGS. 1 and 2 in '609 Publication) and FIGS. 14A and 14B disclose a document feeder that includes a separation arm 101, a first plate spring 103, and a second plate spring 102. A back surface side of the separation arm 101 is supported by the first plate spring 103 which is configured to be elastic. An engagement portion 104 bent to get up from a base of the first plate spring 103 is engaged with an engagement hole 105 provided at a base of the separation arm 101. Thereby, a surface of a distal end side of the separation arm 101 is pressed by a circumferential surface of a feed roller 100.

A base of the second plate spring made of metal is fixed to a housing such as a cover member, together with a base of the first plate spring. The second plate spring 102 has two-forked distal end portions that extend from the base of the second plate spring 102 along both sides in a width direction of the separation arm 101. Each of the two-forked distal end portions of the second plate spring 102 has a distal end bending portion 102*a* formed to bend in a V-shape when laterally viewed. The length of the feed roller 100 in the axial direction thereof is larger than the distance between the two distal end bending portions 102a. When laterally viewed, the two distal end bending portions 102a are located between a position 108 where a leading end of a top sheet of sheets 106 stacked at an upstream side in the sheet feeding direction contacts the circumferential surface of the feed roller 100 and a position 107 where the separation arm 101 contacts the circumferential surface of the feed roller 100 (i.e., a nipping point where a sheet is nipped between the separation arm 101 and the circumferential surface of the feed roller 100. Further, the distal end bending portions 102a are disposed to be in contact with the circumferential surface of the feed roller 100 or as close thereto as possible. According to the above configuration, since an angle θ between the separation arm 101 and the sheets 106 can be set larger, the distal end bending portions 102a can be shifted to a downstream side in the sheet feeding direction relatively in comparison with a conventional configuration. Further, as an angle ϕ between the distal end bending portions 102a and the sheets 106 is set large, the sheets 106 are allegedly separated more certainly so as to avoid a problem such as the multiple-sheet feeding and no-sheet feeding.

SUMMARY

In the meantime, in '609 Publication, when a stack volume [height (H1)] of the sheets 106 placed at an upstream side in the sheet feeding direction is large, and each of the sheets 106 is thin and easily-bendable, the following failure may be caused. In the position 108 where the leading end of the top sheet of the sheets 106 contacts the circumferential surface of the feed roller 100, the leading end of the top sheet is separated and guided in a tangential direction of the circumferential surface of the feed roller 100. In the positions where the two distal end bending portions 102a exist, the leading end of the sheet 106 separated is introduced into between the distal end bending portions 102a and the circumferential surface of the feed roller 100 while being pushed down by an elastic force of the distal end bending portions 102a. Thereby, the leading end of the sheet 106 is not bent to excess.

However, in the position within the width of the separation arm 101 where the two distal end bending portion 102 do not exist, the leading end of the sheet 106 collides against the high-friction surface of the separation arm 101, and the leading end of the sheet 106 is conveyed in the sheet feeding direction while receiving high frictional resistance. Further, the sheet 106 is pushed to a downstream side in the sheet feeding direction by a feeding force given by the circumferential surface of the feed roller 100. Thus the sheet 106 is fed to the downstream side in the sheet feeding direction in a state where the portion of the sheet 106 pushed by the feed roller 100 is reformed in a curled shape.

After that, the leading end of the sheet 106 is conveyed to the nipping point 107 along the surface of the separation arm 101. Accordingly, the leading end of the easily-bendable sheet 106 is conveyed to the downstream side in the sheet feeding direction with the curled shape left partially at a portion thereof within the width of the separation arm 101. Consequently, after document scanning or image printing, the sheet 106 is ejected with the curled shape left at the leading end thereof.

Aspects of the present invention are advantageous to provide one or more improved sheet feeders that make it possible to prevent multiple-sheet feeding and reformation of a leading end of a sheet into a curled shape that might be caused when the leading end of the sheet directly collides against a high-friction surface of a separation arm in an attempt to feed highly stacked easily-bendable sheets separately on a sheet-by-sheet basis through a cooperative operation between a separation roller (a feed roller) and the separation arm.

According to aspects of the present invention, a sheet feeder is provided, which is configured to feed sheets in a predetermined direction sequentially on a sheet-by-sheet basis. The sheet feeder includes a loading portion configured to be loaded with a stack of sheets to be fed, a separation roller configured such that a circumferential surface thereof contacts a leading end of a first sheet to be fed first among the stack of sheets on the loading portion in a contact point and picks up the first sheet and one or more second sheets adjacent to the first sheet from the stack of sheets, a separation arm configured to become closer to the circumferential surface of the separation roller downstream in the predetermined direction so as to nip the first sheet and the second sheets picked up by the separation roller in a nipping point between the separation arm and the circumferential surface of the separation roller, the separation arm adapted to apply higher frictional resistance to the second sheets than that to the first sheet near the nipping point so as to feed the first sheet separately ahead of the second sheets in cooperation with the separation roller, an urging member configured to urge the separation arm toward the separation roller, and a guide member having a guide portion with a lower-friction surface than the separation arm, the guide portion configured to extend from the separation arm with a distal end thereof being in contact with or close to the circumferential surface of the separation roller, the guide portion adapted to contact the first sheet and the second sheets picked up by the separation roller and guide the first sheet and the second sheets to proceed along the circumferential surface of the separation roller between the contact point and the nipping point.

In some aspects of the present invention, when easily-bendable document sheets are stacked high on the loading portion, the leading end of the first sheet of the document sheets establishes contact with the circumferential surface of the separation roller in the contact point, and thereafter the first sheet and one or more second sheets adjacent to the first sheet are fed toward the separation arm in a tangential direction in the contact point on the circumferential direction of the separation roller. Since the guide portion of the guide member extends from the separation arm with the distal end thereof being in contact with or close to the circumferential surface of the separation roller, the leading ends of the first sheet and the second sheets certainly collide against the guide portion when proceeding to the separation arm. At this time, the guide portion, which has a low-friction surface, is elastically bent and forms a gap through which the first sheet and the second sheets can pass.

Further, in some aspects of the present invention, the guide portion is configured to guide the first sheet and the second sheets to proceed along the circumferential surface of the separation roller between the contact point and the nipping point at a downstream side in a sheet feeding direction (the predetermined direction) relative to the contact point.

Accordingly, when the first sheet and the second sheets are guided along the circumferential surface of the separation roller, the leading end of a sheet closer to the circumferential surface of the separation roller is fed ahead of the leading end of the adjacent sheet. Consequently, the leading ends of the first sheet and the second sheets are smoothly fed to the nipping point between the separation roller and the separation arm, forming a wedge shape when viewed in an axial direction of the separation roller. Additionally, near the nipping point, owing to a higher frictional resistance from the separation arm than that from the guide portion, the second sheets other than the first sheet are prevented from proceeding. Thereby, since only the first sheet is fed separately ahead of the second sheets, it is possible to avoid multiple-sheet feeding. Thus, since the first sheet and the second sheets advance substantially parallel to a surface of the separation arm, it is possible to prevent the leading ends of the sheets from being reformed in a curled shape in a conventional fashion.

It is noted that the aforementioned first sheet denotes a sheet that is the closest to the circumferential surface of the separation roller among the stack of sheets loaded on the loading portion. Therefore, when the separation arm is disposed below the separation roller and plural sheets are stacked on the separation arm, the first sheet is a top sheet of the stacked sheets. On the contrary, when the separation arm is disposed above the separation roller and plural sheets are stacked between the back surface of the separation arm and the circumferential surface of the separation roller, the first sheet is a bottom sheet of the stacked sheets.

Further, the guide portion may be formed by bending the guide member so as to get up at an appropriate angle from a surface of the separation arm with the distal end thereof being in contact with or close to the circumferential surface of the separation roller. In this case, event though the guide portion is pushed down in sheet feeding to such an extent as to lie along the surface of the separation arm, the distal end of the guide portion never reaches the nipping point between the separation roller and the separation arm. Thus, it is possible to prevent the multiple-sheet feeding.

According to aspects of the present invention, further provided is an image scanner, which includes a sheet feeder configured to feed document sheets in a predetermined direction sequentially on a sheet-by-sheet basis, and a scanner unit configured to scan images on the document sheets fed by the sheet feeder. The sheet feeder includes a loading portion configured to be loaded with a stack of sheets to be fed, a separation roller configured such that a circumferential surface thereof contacts a leading end of a first sheet to be fed first among the stack of sheets on the loading portion in a contact point and picks up the first sheet and one or more second sheets adjacent to the first sheet from the stack of sheets, a separation arm configured to become closer to the circumferential surface of the separation roller downstream in the predetermined direction so as to nip the first sheet and the second sheets picked up by the separation roller in a nipping point between the separation arm and the circumferential surface of the separation roller, the separation arm adapted to apply higher frictional resistance to the second sheets than that to the first sheet near the nipping point so as to feed the first sheet separately ahead of the second sheets in cooperation with the separation roller, an urging member configured to urge the separation arm toward the separation roller, and a guide member having a guide portion with a lower-friction surface than the separation arm, the guide portion configured to extend from the separation arm with a distal end thereof being in contact with or close to the circumferential surface of the separation roller, the guide portion adapted to contact the first sheet and the second sheets picked up by the separation roller and guide the first sheet and the second sheets to proceed along the circumferential surface of the separation roller between the contact point and the nipping point.

In some aspects of the present invention, the image scanner configured as above can provide the same effects as the aforementioned sheet feeder.

According to aspects of the present invention, further provided is a printer, which includes an image scanner that includes a sheet feeder configured to feed document sheets with images thereon in a predetermined direction sequentially on a sheet-by-sheet basis, and a scanner unit configured to scan the images on the document sheets fed by the sheet feeder, a feed unit configured to feed print sheets, and a printer unit configured to print the images scanned by the scanner unit onto the print sheets fed by the feed unit. The sheet feeder includes a loading portion configured to be loaded with a stack of sheets to be fed, a separation roller configured such that a circumferential surface thereof contacts a leading end of a first sheet to be fed first among the stack of sheets on the loading portion in a contact point and picks up the first sheet and one or more second sheets adjacent to the first sheet from the stack of sheets, a separation arm configured to become closer to the circumferential surface of the separation roller downstream in the predetermined direction so as to nip the first sheet and the second sheets picked up by the separation roller in a nipping point between the separation arm and the circumferential surface of the separation roller, the separation arm adapted to apply higher frictional resistance to the second sheets than that to the first sheet near the nipping point so as to feed the first sheet separately ahead of the second sheets in cooperation with the separation roller, an urging member configured to urge the separation arm toward the separation roller, and a guide member having a guide portion with a lower-friction surface than the separation arm, the guide portion configured to extend from the separation arm with a distal end thereof being in contact with or close to the circumferential surface of the separation roller, the guide portion adapted to contact the first sheet and the second sheets picked up by the separation roller and guide the first sheet and the second sheets to proceed along the circumferential surface of the separation roller between the contact point and the nipping point.

In some aspects of the present invention, the printer configured as above can provide the same effects as the aforementioned sheet feeder and image scanner.

BRIEF DESCRIPTION OF THE ACCOMPANYING DRAWINGS

Figure 14A:
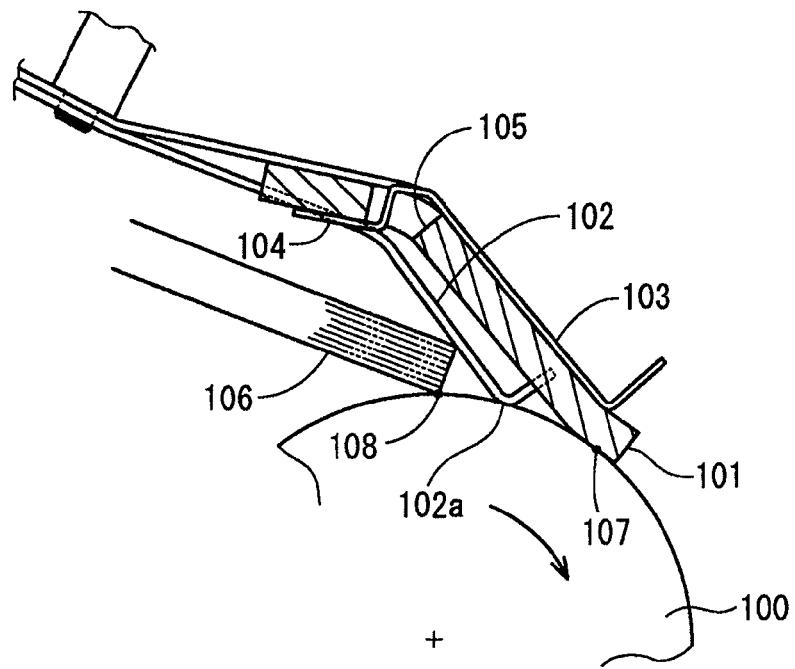
FIG. 14A is a diagram for illustrating operations of a separation feed mechanism in a prior art.
Figure 14B:
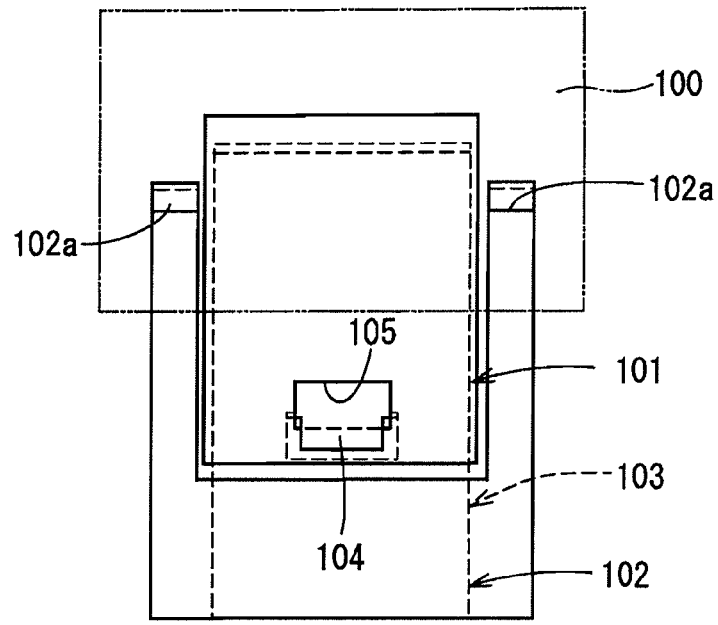

FIG. 14B schematically shows a configuration of the separation feed mechanism in the prior art.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, embodiments according to aspects of the present invention will be described with reference to the accompanying drawings. In the embodiments, aspects of the present invention are applied to a sheet feeder 2 incorporated in an image scanner 1 of a Multi-Function Peripheral (MFP) 300 provided with a facsimile function, a scanner function, a copy function, and a printer function.

Figure 3:
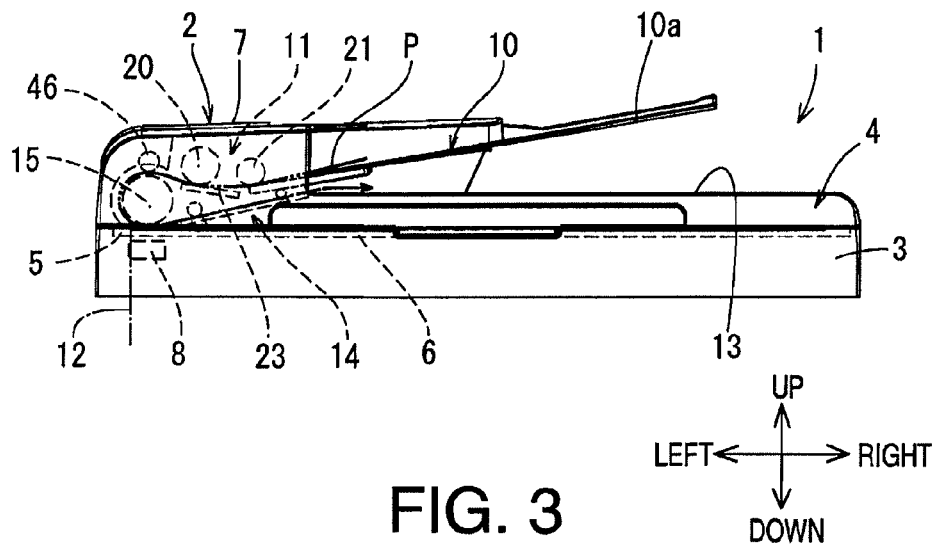
FIG. 3 is a front view of the image scanner in the first embodiment according to one or more aspects of the present invention.
Figure 5:
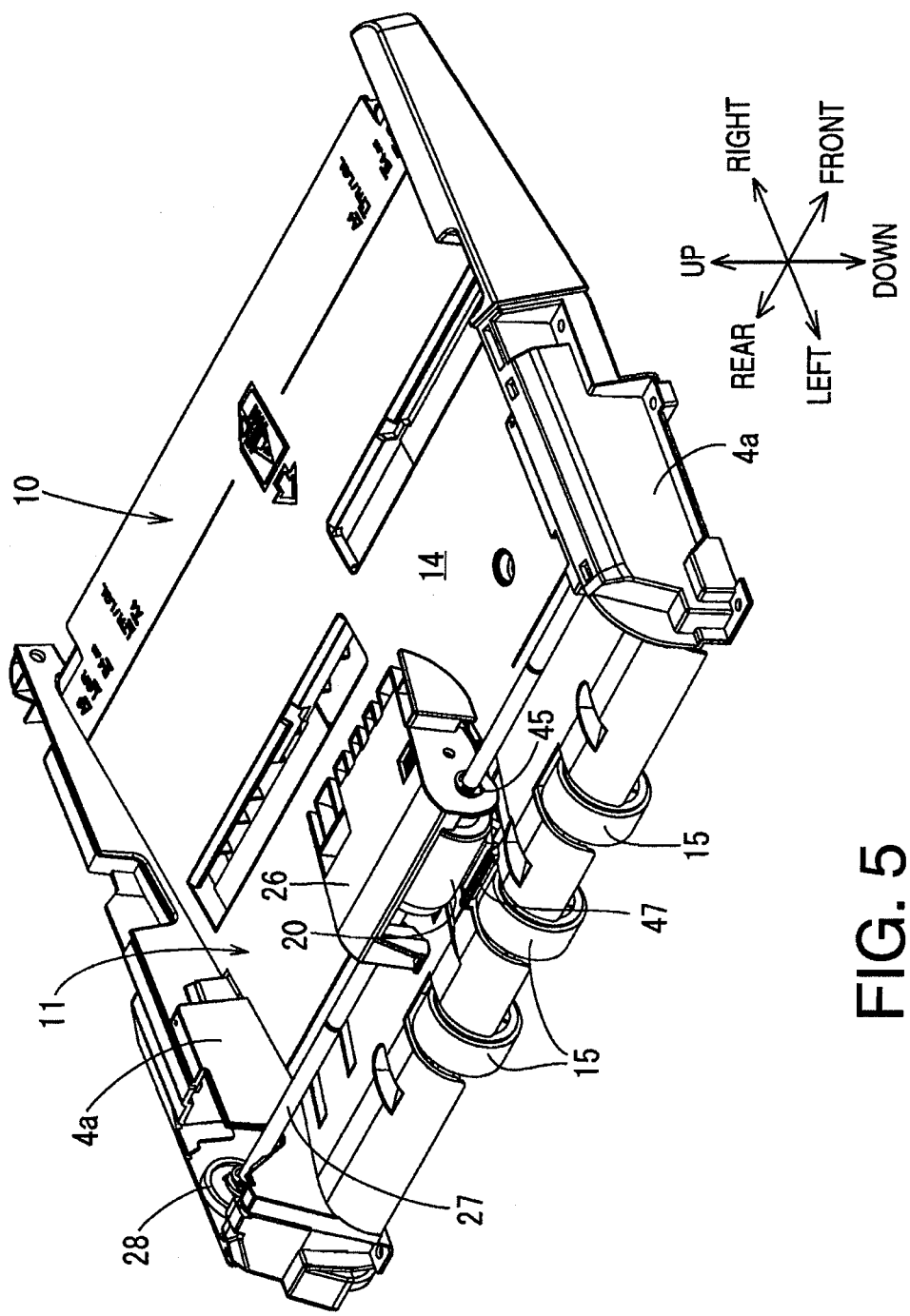
FIG. 5 is a perspective view of the image scanner in a state where the cover is removed therefrom in the first embodiment according to one or more aspects of the present invention.
Figure 6:
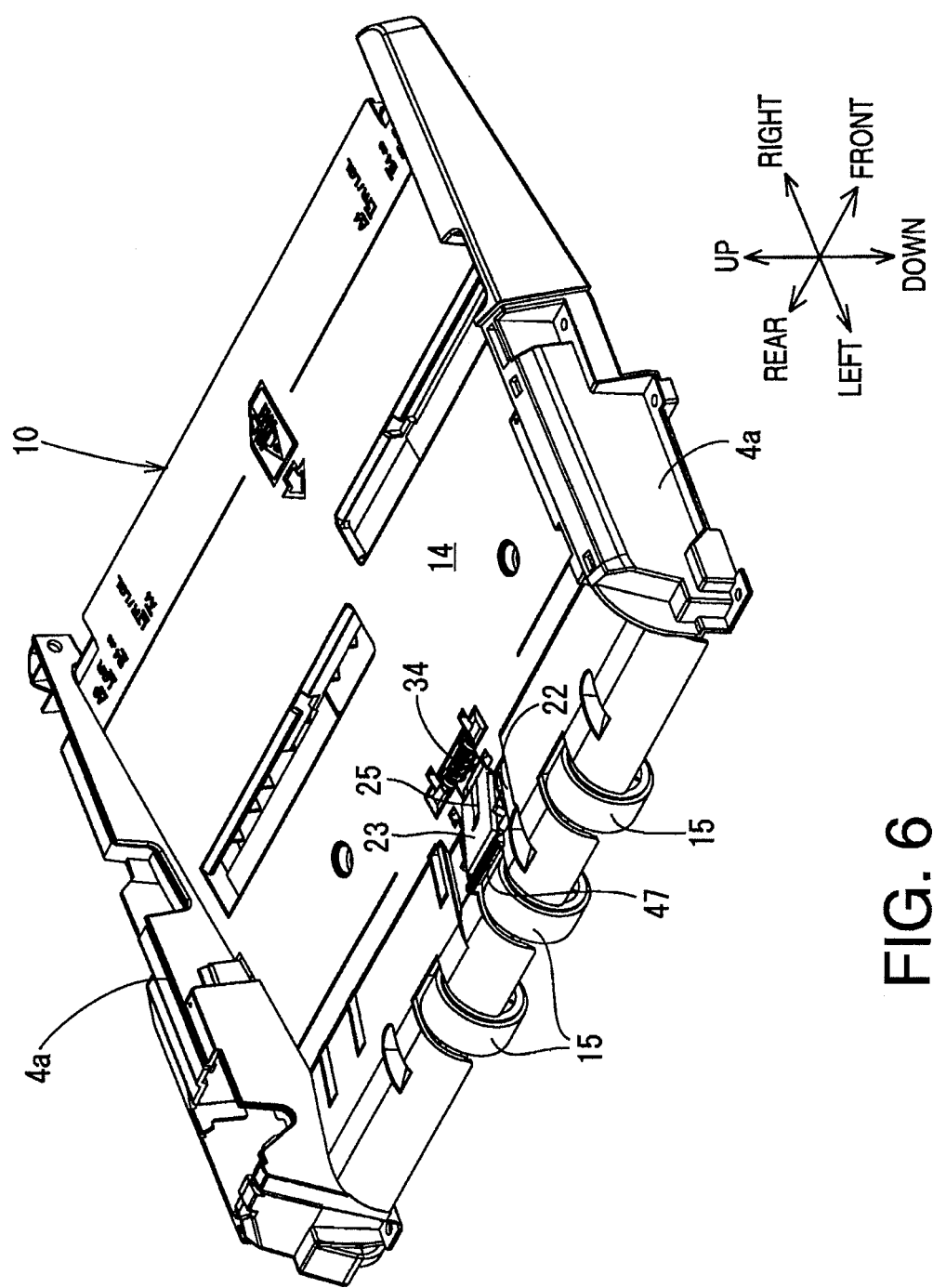
FIG. 6 is a perspective view of the image scanner in a state where the cover, a separation roller, and a case are removed therefrom in the first embodiment according to one or more aspects of the present invention.

The image scanner 1 of a first embodiment includes a main body case 3 placed on a housing (not shown) of the MFP 300, a cover body 4 attached to a rear end of the main body case 3 through a hinge (not shown) rotatably in the vertical direction, and an Automatic Document Feeder (ADF) (the sheet feeder 2) provided at a side on the cover body 4. On an upper surface of the main body case 3 that is exposed when the cover body 4 is opened, a large-sized glass plate 5 (see FIG. 5) for a static document is horizontally fixed. Further, on a side of the upper surface of the main body case 3, an elongated glass plate 6 for a fed document is horizontally fixed. Beneath the glass plates 5 and 6, a scanner unit 8 such as a line image sensor is provided, which is configured to render light emitted by a light source incident onto a document through the glass plates 5 and 6, converge the light reflected by the document onto a light receiving element through a lens, and convert the intensity of the light received by the light receiving element into an electric signal. It is noted that the scanner unit 8 is configured to be translated in a left-to-right direction (see FIG. 3) along a guide shaft by a known driving mechanism.

In the first embodiment, the scanner unit 8 is a Contact Image Sensor (CIS), but it may be a Charge Coupled Device (CCD). When document sheets 9 (see FIG. 7) are scanned while being fed by the sheet feeder 2, the scanner unit 8 is rendered still under a scanning position 12 of the glass plate 5. Meanwhile, when a document sheet 9 is placed on the glass plate 6 with a surface having images and/or characters thereon up and scanned, the scanner unit 8 is translated along a lower surface of the glass plate 6 in the left-to-right direction (see FIG. 3). It is noted that a holding member (not shown) configured with a sponge and a white board is provided on a lower surface of the cover body 4.

Figure 2:
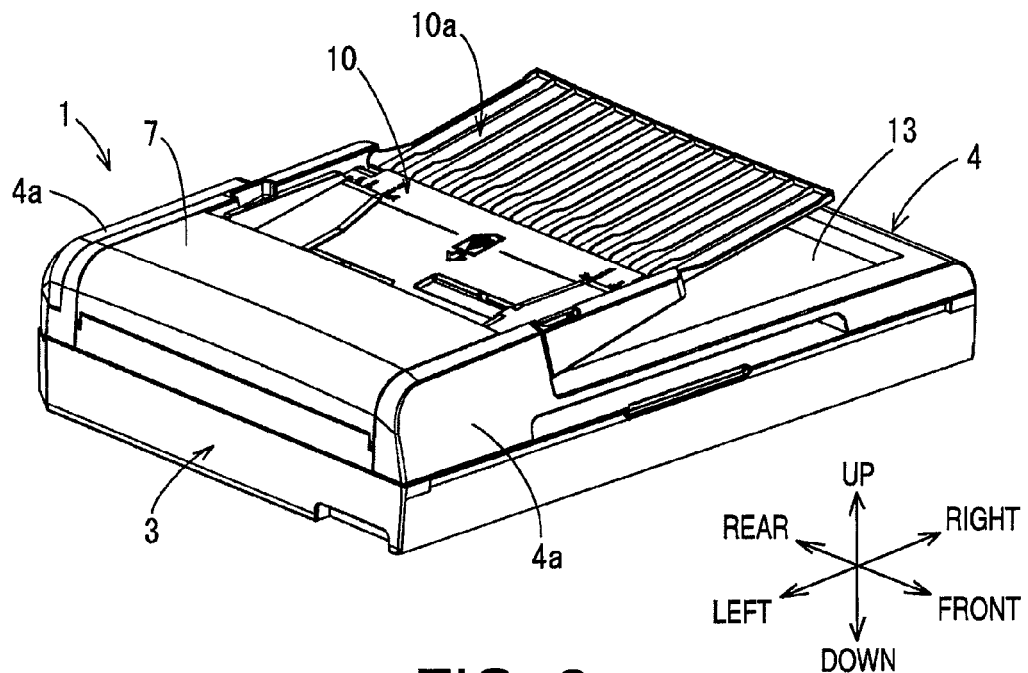
FIG. 2 is a perspective view of the image scanner provided with the sheet feeder in the first embodiment according to one or more aspects of the present invention.
Figure 4:
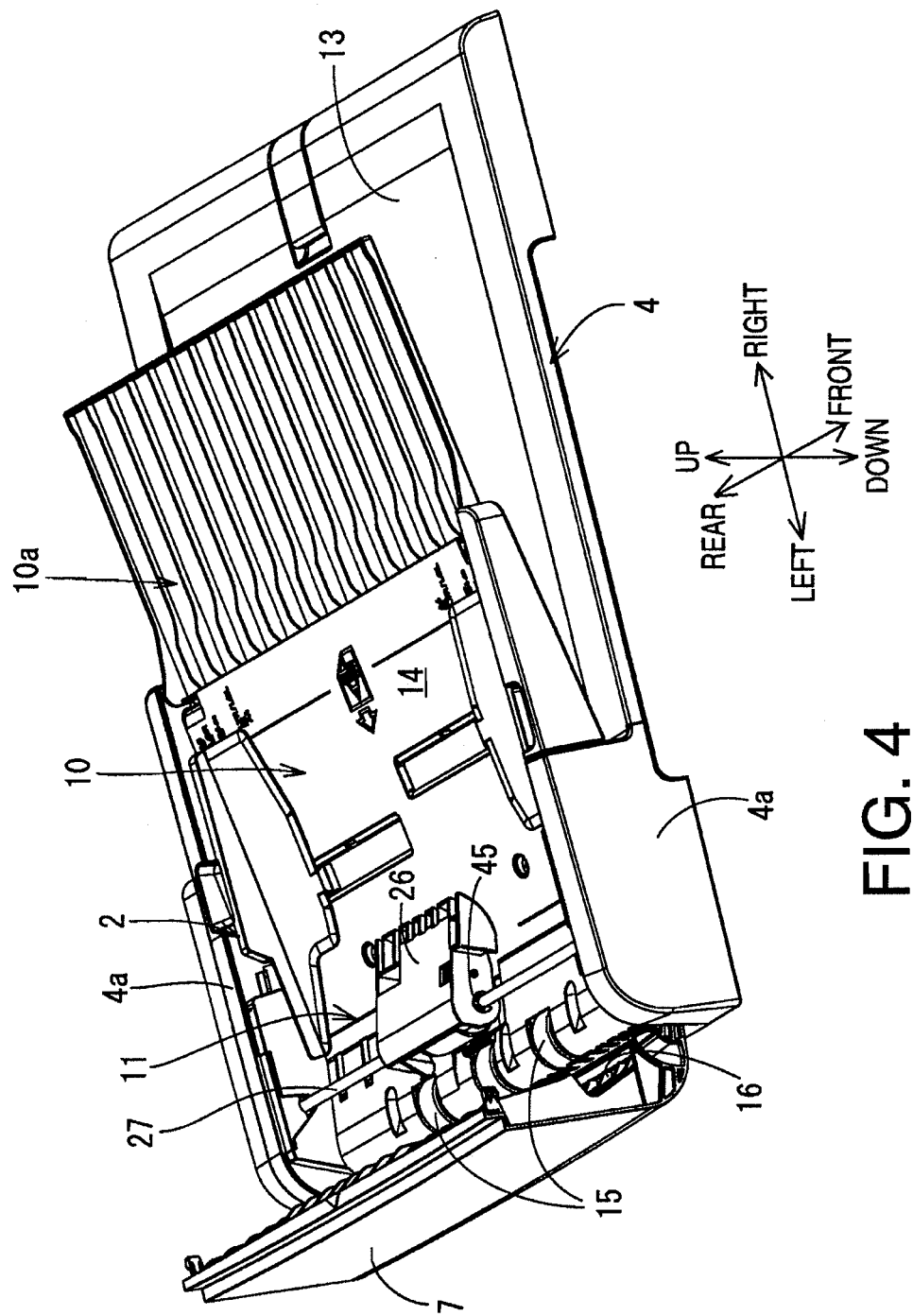
FIG. 4 is a perspective view of the image scanner in a state where a cover is opened in the first embodiment according to one or more aspects of the present invention.

As illustrated in FIGS. 2 and 4, a cover 7 that covers an upper side of the sheet feeder 2 is placed between a pair of side covers 4a provided at a left side of the cover body 4 in FIG. 2. The cover 7 is attached rotatably around a hinge (not shown) provided at a left end of the pair of side covers 4a.

[Sheet Feeder]

Figure 1:
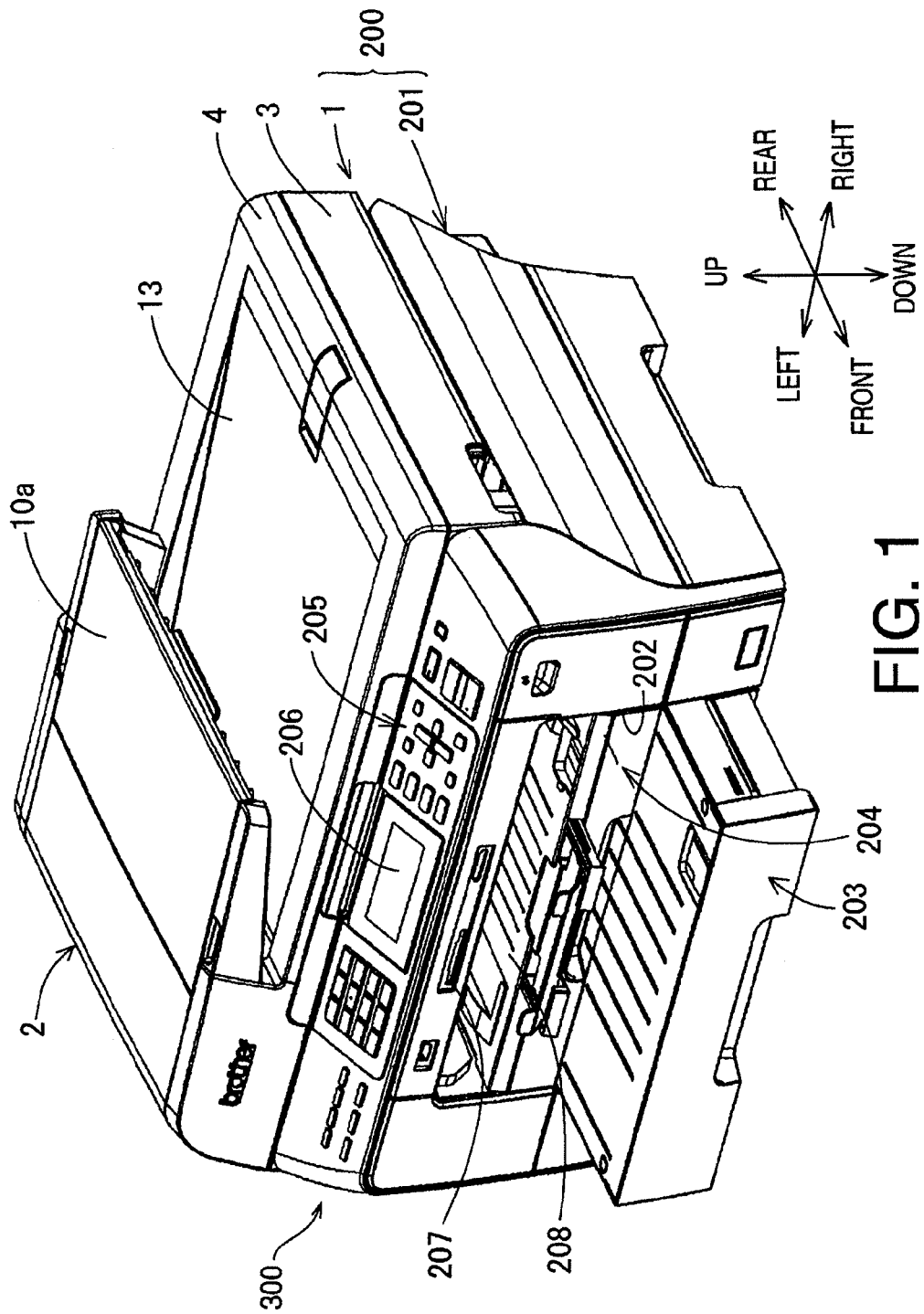
FIG. 1 is a perspective view of a Multi-Function Peripheral (MFP) that incorporates therein an image scanner provided with a sheet feeder in a first embodiment according to one or more aspects of the present invention.

The sheet feeder 2 includes a feed unit 10 that has a feed tray 10a and a document loading table 14, a separation feed mechanism 11 configured to separate the document sheets 9 stacked on the feed unit 10 and feed the document sheets 9 sequentially on a sheet-by-sheet basis, and a conveyer unit configured to convey the document sheets 9 to the aforementioned scanning position 12 and eject the scanned sheets 9 onto a catch tray 13. A document carrying path is formed in a U-shape such that the document sheets 9 are conveyed from the separation feed mechanism 11 to the catch tray 13 via the scanning position 12. The catch tray 13 is formed on the cover body 4. The feed unit 10 and the feed tray 10a are provided above the catch tray 13 and tilted down to the separation feed mechanism 11 (see FIGS. 1 and 2). The conveyer unit includes plural feed rollers 15 (see FIGS. 3 to 6) and a U-turn guide 16 (see FIG. 4). The feed rollers 15 are configured with a large diameter to form a U-turn portion and disposed at a downstream side relative to the scanning position 12 on the document carrying path at intervals of a predetermined distance. The U-turn guide 16 is provided on an inner surface of the cover 7 so as to cover left halves of outer circumferential surfaces of the feed rollers 15 a predetermined distance away from the feed rollers 15 such that a document sheet can pass therethrough. Accordingly, when the document sheets 9 are stacked on the feed unit 10 and the feed tray 10a with image formed surfaces thereof up, a document sheet 9 passes, with the image formed surface thereof down, through the scanning position 12 on the U-shaped document carrying path.

[Separation Feed Mechanism]

Subsequently, a configuration of the separation feed mechanism 11 will be set forth in detail. As illustrated in FIGS. 3 to 6, the separation feed mechanism 11 is disposed near a lower end of the document loading table 14 of the feed unit 10 on which the document sheets 9 are stacked. The separation feed mechanism 11 includes a separation roller 20 disposed above the document loading table 14, a pickup roller 21, a separation arm 23 configured to protrude upward from an attachment hole 22 of the document loading table 14 and contact a lower side of a circumferential surface of the separation roller 20, a metal spring plate 24 configured to press the separation arm 23 against the separation roller 20, and a guide member 25 disposed on an upper surface of the spring plate 24.

The separation roller 20 and the pickup roller 21 are disposed within a case 26 configured to open down. A driving force to rotate the separation roller 20 is transmitted to a transmission gear 28 which is attached to an end of a drive shaft 27 configured to rotate in conjunction with the separation roller 20 via a transmission mechanism (not shown) provided in one of the side covers 4a. The separation arm 23, the case 26, and the separation roller 20 are located in a center of the document loading table 14 in a width direction (i.e., the left-to-right direction, which is perpendicular to a sheet feeding direction in which the document sheets 9 are conveyed and parallel to surfaces of the document sheets 9). A length of the separation roller 20 in the width direction is set shorter than a length of the document loading table 14 in the width direction. Thus, since the separation roller 20 is disposed in a central position of the document loading table 14 in the width direction, regardless of a width size of the document sheets 9, the separation roller 20 can always establish contact with central portions of the document sheets 9 in the width direction. On an outer circumferential surface of a sleeve 20a of the separation roller 20, a surface layer 29 is provided which is made of high-friction material such as rubber. Meanwhile, the separation arm 23 is made of high-friction material such as rubber and cork.

Figure 12A:
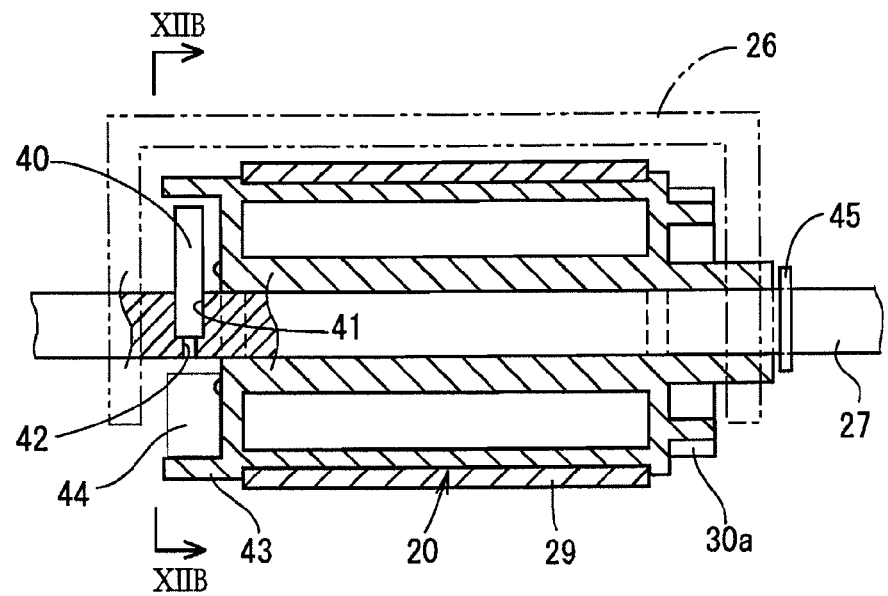
FIG. 12A is a cross-sectional side view schematically showing a power transmission mechanism for transmitting a driving force to the separation roller in the first embodiment according to one or more aspects of the present invention.
Figure 12B:
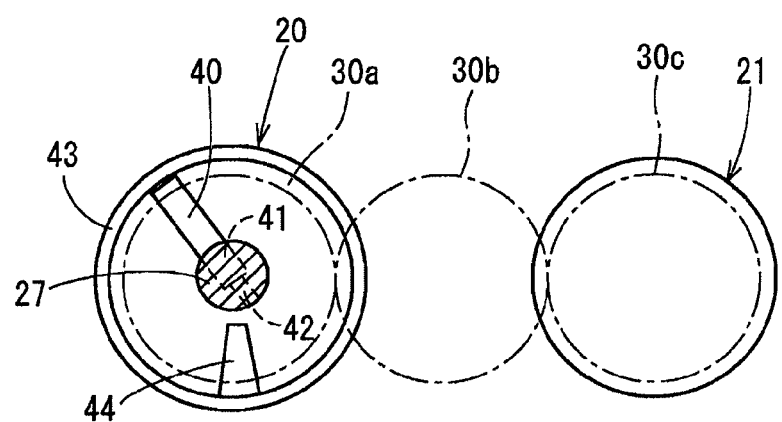
FIG. 12B is a cross-sectional view of the power transmission mechanism along a line XIIB-XIIB shown in FIG. 12A in the first embodiment according to one or more aspects of the present invention.

As illustrated in FIG. 12B, a driving force is transmitted from a first transmission gear 30a formed at a side of the separation roller 20, via a second transmission gear 30b rotatably borne within the case 26, to a third transmission gear 30c formed at a side of the pickup roller 21. At this time, the separation roller 20 and the pickup roller 21 are rotated in the same direction at substantially the same circumferential velocity. As substitute for the above gears, a timing belt may be wound around respective sides of the separation roller 20 and the pickup roller 21.

Figure 7:
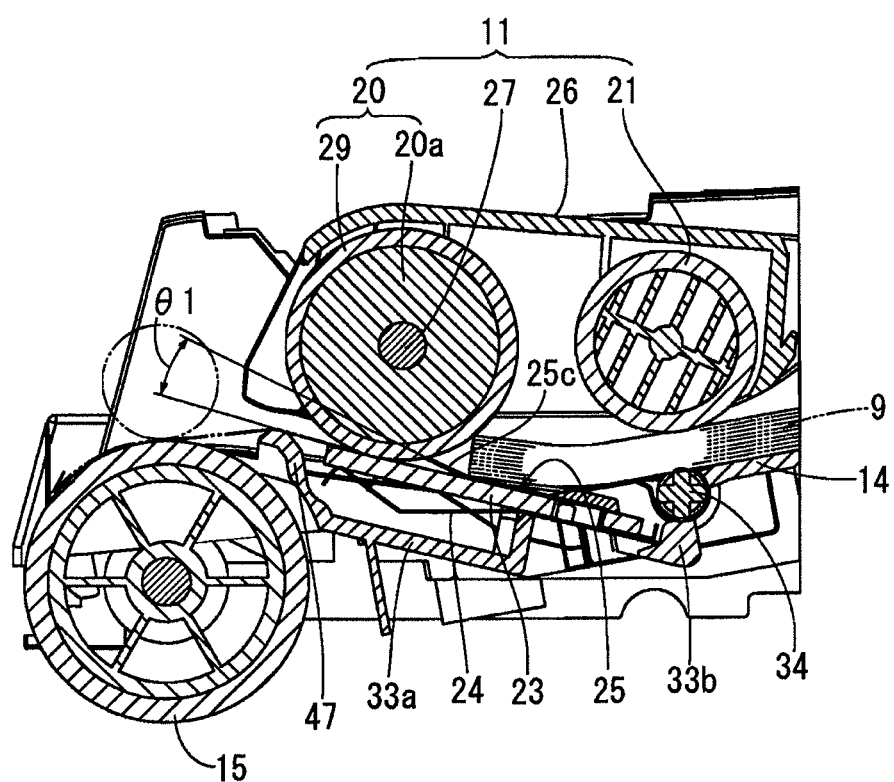
FIG. 7 is a cross-sectional enlarged front view showing a main part of a separation feed mechanism in the first embodiment according to one or more aspects of the present invention.
Figure 8A:
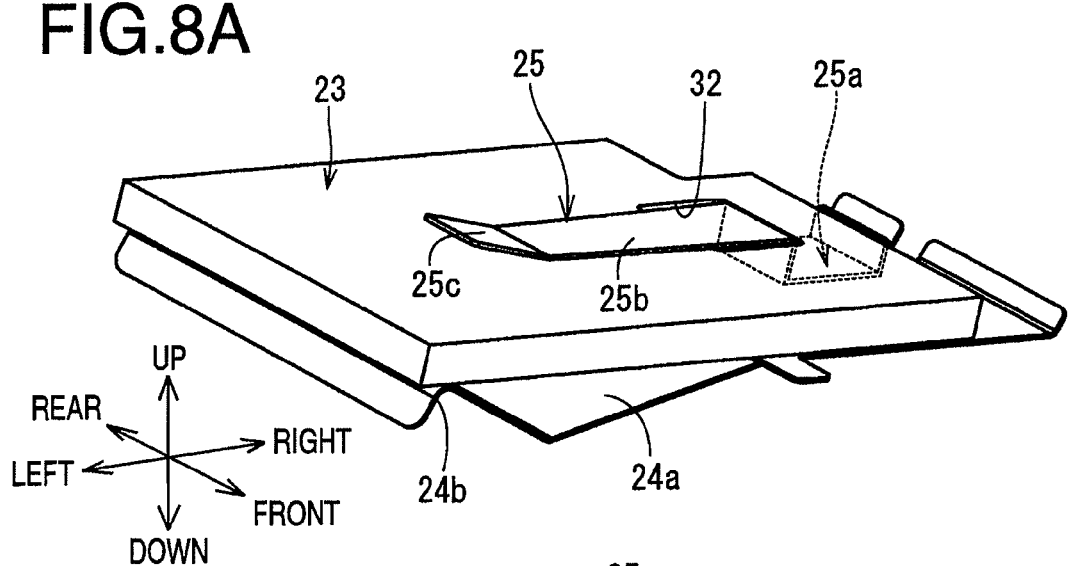
FIG. 8A is a perspective view showing an assembly of a separation arm, a guide member, and a spring plate included in the separation feed mechanism in the first embodiment according to one or more aspects of the present invention.
Figure 8B:
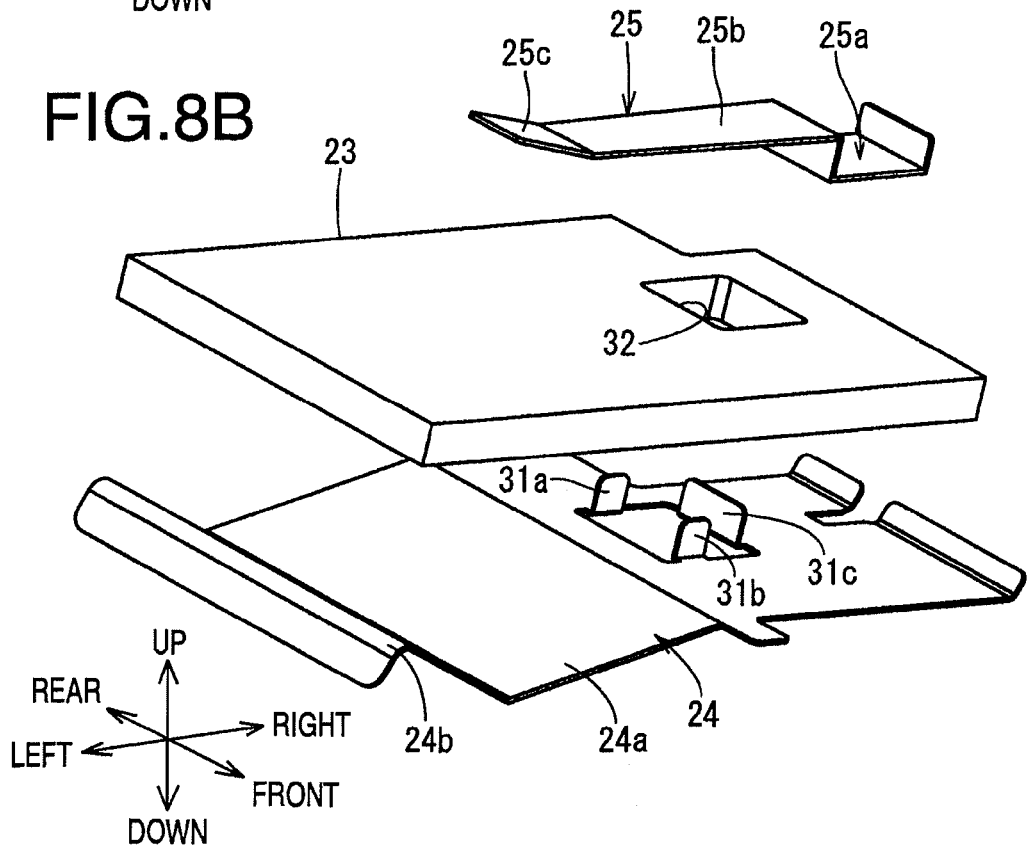
FIG. 8B is a perspective view showing an exploded state of the separation arm, the guide member, and the spring plate included in the separation feed mechanism in the first embodiment according to one or more aspects of the present invention.

As illustrated in FIGS. 8A and 8B, plural engagement portions 31a, 31b, and 31c (in the first embodiment, three engagement portions provided in their respective directions) are formed to be cut and got up from a base of the spring plate 24. With the engagement portions 31a, 31b, and 31c fitted into a rectangular attachment hole 32 formed at a base of the separation arm 23, An attachment attitude of the separation arm 23 is held relative to the spring plate 24. The spring plate 24 is bent at an intermediate portion 24a thereof in a downward V-shape, and supports a distal end side of a back surface of the separation arm 23 with a distal end portion 24b of the spring plate 24. As shown in FIG. 7, both the bases of the spring plate 24 and the separation arm 23 are engaged in an unmovable manner with synthetic resin support frames 33a and 33b of the document loading table 14.

In addition, the guide member 25, which is made of low-friction material such as PET (polyethylene terephthalate resin or polyethylene resin) film material, is formed as a strip that is long in the sheet feeding direction and short in the width direction. Further, the guide member 25 includes a folded portion 25a that is provided at a base thereof and formed in a rectangle U-shape. The folded portion 25a is partially pinched between a right end wall of the attachment hole 32 of the separation arm 23 and the engagement portion 31c, and fitted into the attachment hole 32 in contact with a right end portion of the separation arm 23. Hence, the guide member 25 is fixed in a manner unmovable in a front-to-rear direction or the left-to-right direction.

As illustrated in FIGS. 8A and 8B, the guide member 25 includes an intermediate portion 25b disposed in contact with or close to an upper surface of the separation arm 23, and a guide portion 25c provided at a distal end of the guide member 25. The guide portion 25c of the guide member 25 is tilted upward at an appropriate acute angle θ1 so as to be away from a nipping point N on the upper surface of the separation arm 23 (see FIG. 9).

Figure 9:
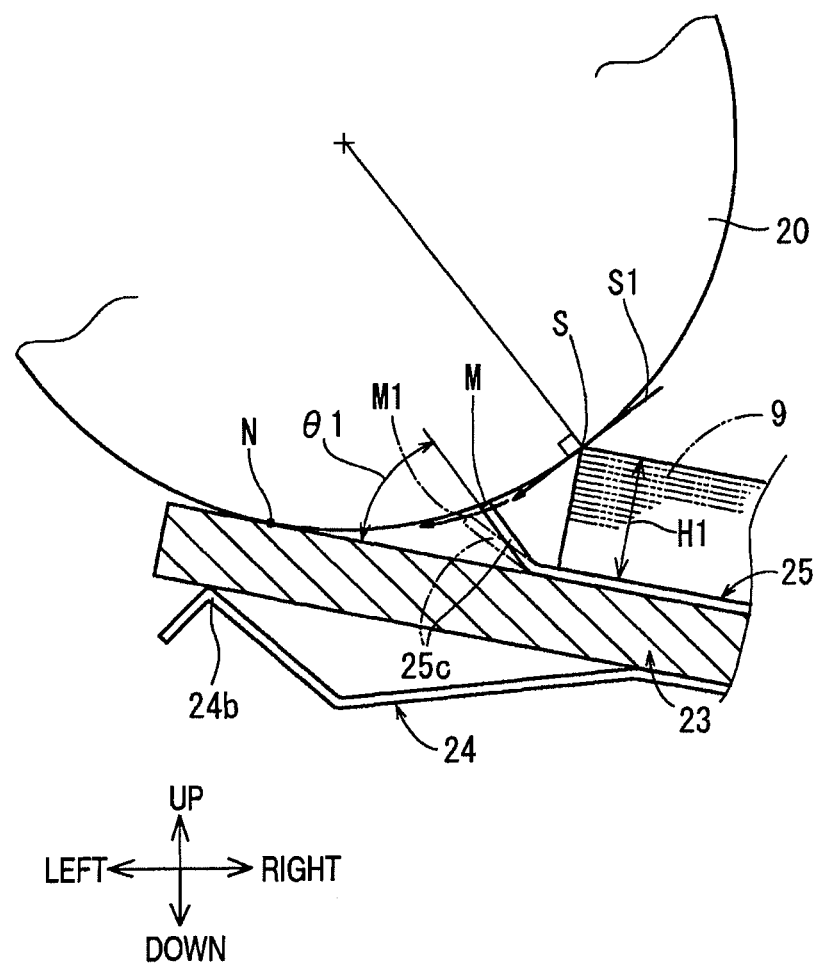
FIG. 9 is a diagram for illustrating operations of the separation feed mechanism in the first embodiment according to one or more aspects of the present invention.

In the first embodiment, the separation roller 20 has a diameter as long as 27 mm and a dimension in the width direction longer than that (30 mm to 50 mm) of the separation arm 23. Further, the guide member 25 has a thickness of about 0.25 mm, and the guide portion 25c (a portion configured to get up from the upper surface of the separation arm 23) as long as 5 mm to 6 mm. Furthermore, the angle θ1 is about 20 degrees to 60 degrees. A distal end of the guide portion 25c is desired to be in contact with the circumferential surface of the separation roller 20, yet may be disposed to be as close to the circumferential surface of the separation roller 20 as possible. As illustrated in FIG. 9, in a side view in the front-to-rear direction, a point where the guide portion 25c begins to get up from the upper surface of the separation arm 23 is located between a contact point S where a top sheet of the document sheets 9 stacked on the separation arm 23 establishes contact with the circumferential surface of the separation roller 20 and the nipping point N where the circumferential surface of the separation roller 20 and the upper surface of the separation arm 23. Furthermore, a point M (hereinafter, referred to as a "distal end M" of the guide portion 25c) where the distal end of the guide portion 25c establishes contact with the circumferential surface of the separation roller 20 is located between the contact point S and the nipping point N.

According to the aforementioned configuration, referring to FIGS. 7 and 9, explanation will be given about operations of sheet separation and sheet feeding when the document sheets 9 stacked on the document loading table 14 are evaluated as many as 50 sheets (as high as an estimated height H1 of 5 mm) in volume of normal sheets. When the document sheets 9 of the above predetermined volume, stacked on the document loading table 14, are pushed toward the pickup roller 21, the pickup roller 21 turns upward around the drive shaft 27 together with the case 26, and the document sheets 9 stacked can be pushed until the sheets 9 come into contact with the circumferential surface of the separation roller 20. It is noted that, according to a configuration mentioned below, the pickup roller 21 may be configured to be rotatable freely when the drive shaft 27 is stopped. In addition, a driven pinch roller 34 is disposed below the pickup roller 21. The driven pinch roller 34 is configured to be freely rotatable and to partially protrude from the surface of the document loading table 14.

When the drive shaft 27 is rotated, for example, in response to an instruction to scan the document sheets 9, and thereby the separation roller 20 and the pickup roller 21 are rotated in synchronization with each other, a leading end of the top sheet 9 of the document sheets 9 stacked on the document loading table 14 comes into contact with the circumferential surface of the separation roller 20 at the contact point S. After that, one or a few sheets 9, including the top sheet 9, are fed downward in a tangential direction S1 at the contact point S on the circumferential surface of the separation roller 20. The guide portion 25c, which is elastic, is tilted upward so as to be away from the upper surface of the separation arm 23 with the distal end M thereof being in contact with or close to the circumferential surface of the separation roller 20. Hence, when proceeding obliquely down toward the upper surface of the separation arm 23, leading ends of the one or more sheets 9 certainly collide against the guide portion 25c. Since the guide portion 25c is provided with a low-friction surface and configured as a whole to be elastic, the guide portion 25c bows down around a joint between the guide portion 25c and the intermediate portion 25b along with the proceeding of the leading ends of the one or more sheets 9. It leads to a gap formed between the guide portion 25c and the circumferential surface of the separation roller 20 so as to allow one or more sheets 9 to pass therebetween (see a double-dashed chain line in FIG. 8).

Meanwhile, the leading ends of the one or more sheets 9 are guided in a direction M1 to be closer to the circumferential surface of the separation roller 20. In this situation, the leading end of the top sheet 9 closest to the circumferential surface of the separation roller 20 goes ahead, and the leading ends of the other underlying adjacent sheets 9 go behind, forming a wedge shape in a side view thereof. Consequently, the leading ends of the sheets 9 are smoothly fed to the nipping point N where the circumferential surface of the separation roller 20 contacts the separation arm 23 (see FIG. 9). Near the nipping point N, owing to frictional resistance from the separation arm 23, the sheets 9 other than the top sheet 9 are prevented from proceeding, and the top sheet 9 is only fed separately from the other sheets 9. Accordingly, these sheets 9 proceed substantially parallel to the upper surface of the separation arm 23, and thus it is possible to prevent the leading ends of the sheets 9 from being reformed in a curled shape in a conventional fashion.

As described above, the guide member 25 is bent at the joint between the intermediate portion 25b and the guide portion 25c such that the guide portion 25c gets up from the upper surface of the separation arm 23 to be in contact with or close to the circumferential surface of the separation roller 20. Therefore, even though the nipping point N between the circumferential surface of the separation roller 20 and the separation arm 23 is somewhat shifted to an upstream side or a downstream side in the sheet feeding direction due to a positional error of the guide member 25 attached relative to the separation arm 23 or positional errors of the actually attached separation roller 20 and separation arm 23 relative to their design values, the leading ends of the top sheet 9 and the other underlying adjacent sheets 9, which are fed by the rotation of the separation roller 20, can certainly come into contact with the guide portion 25c.

In other words, even though the easily-bendable document sheets 9 to be fed are highly stacked, it is possible to easily attain an operation of certainly separating and feeding the document sheets 9 on a sheet-by-sheet basis with the leading ends of the document sheets 9 not reformed into a curled shape without multiple-sheet feeding or no-sheet feeding. Further, it is possible to incorporate the separation feed mechanism 11 into the sheet feeder 2 more easily.

Subsequently, a separation feed mechanism 11 in a second embodiment will be described with reference to FIGS. 9A, 9B, 10A, and 10B. In the second embodiment, configurations of a separation roller 20 and a pickup roller 21 are the same as those in the first embodiment. In addition, configurations of a separation arm 23 and a spring plate 24 adapted to press the separation arm 23 from beneath against a circumferential surface of the separation roller 20 are the same as those in the first embodiment.

A guide member 35, which is made of low-friction material such as PET (polyethylene terephthalate resin or polyethylene resin) film material, is designed to be shorter in the width direction (namely, in the front-to-rear direction perpendicular to the sheet feeding direction) than the separation arm 23. In the second embodiment, the guide member 35 includes a flat base portion 35a and an intermediate portion 35b that are provided at a side of a back surface of the separation arm 23. The guide member 35 further includes a rectangular attachment hole 36 formed in the base portion 35a. With the attachment hole 36 engaged with plural engagement portions 31a, 31b, and 31c (in the second embodiment, three engagement portions provided in their respective directions) formed to be cut and got up from the base of the spring plate 24 in contact with outer surfaces of the engagement portions 31a, 31b, and 31c, the position and the posture of the guide member 35 are regulated.

Figure 10A:
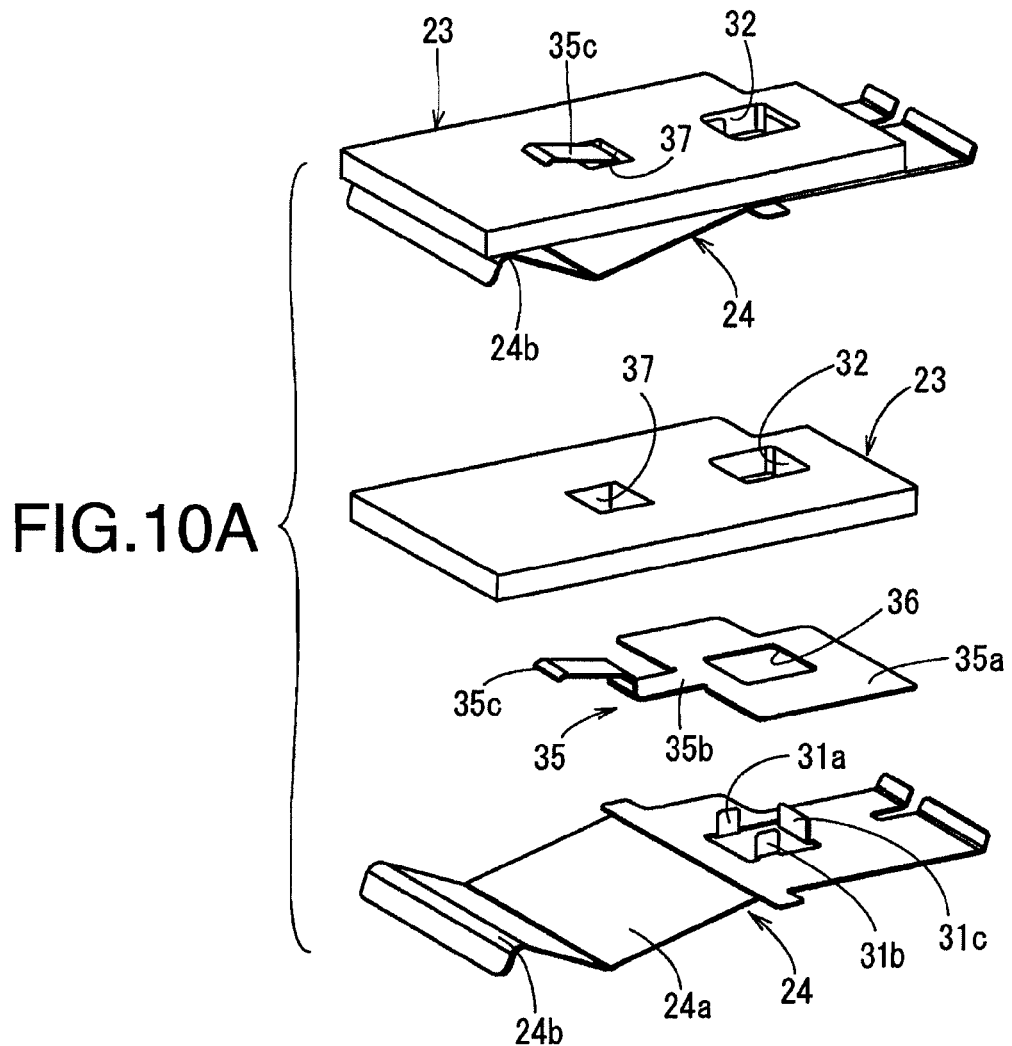
FIG. 10A shows an assembly and an exploded state of a separation arm, a guide member, and a spring plate included in a separation feed mechanism in a second embodiment according to one or more aspects of the present invention.
Figure 10B:
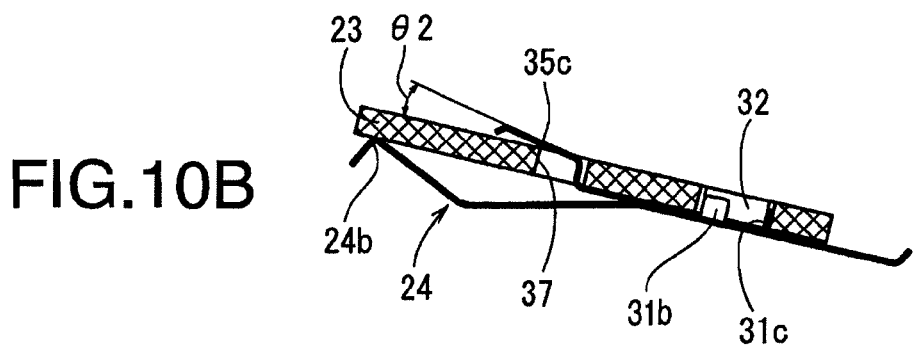
FIG. 10B is a cross-sectional front view of the assembly of the separation arm, the guide member, and the spring plate included in the separation feed mechanism in the second embodiment according to one or more aspects of the present invention.
Figure 11A:
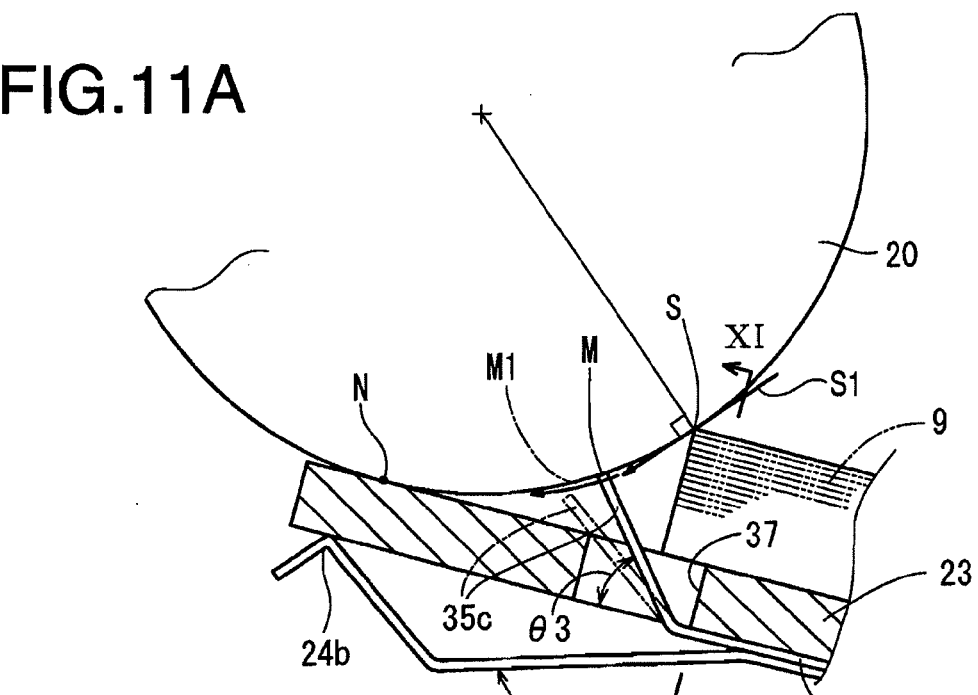
FIG. 11A is a diagram for illustrating operations of the separation feed mechanism in the second embodiment according to one or more aspects of the present invention.
Figure 11B:
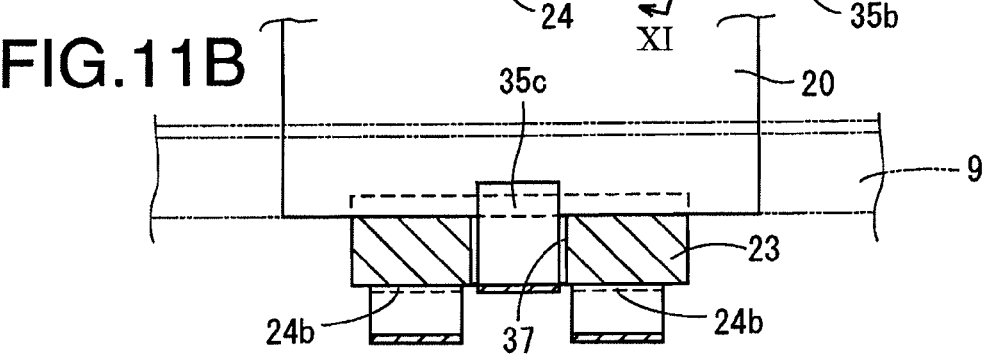
FIG. 11B is a cross-sectional view of the separation feed mechanism along a line XI-XI shown in FIG. 11A in the second embodiment according to one or more aspects of the present invention.

The guide member 35 further includes a guide portion 35c bent up from the intermediate portion 35b of the guide member 35. The guide portion 35c is provided to extend toward the circumferential surface of the separation roller 20 through a window hole 37 formed in a distal end side of the separation arm 23 (a side closer to the nipping point N of the separation arm 23 with the separation roller 20) (see FIG. 11A). The portion 35c may be bent up from the intermediate portion 35b of the guide member 35 in the following two forms. One is, as illustrated in FIGS. 10A and 10B, a form of the guide portion 35c got up at a small angle θ2 relative to the separation arm 23 so as to contact the circumferential surface of the separation roller 20 after once being got up at an angle as large as 90 degrees. The other is, as illustrated in FIG. 11A, a form of the guide portion 35c directly bent up at an acute angle θ3 from the intermediate portion 35b of the guide member 35. Furthermore, a distal end portion of the guide members 25c or 35c may include a portion slightly bent down.

In any of the above forms, substantially the same separating operation as the first embodiment makes it possible to separate and feed the top sheet 9 and the plural underlying adjacent sheets 9 certainly on a sheet-by-sheet basis without reformation of the leading ends of the sheets 9 into a curled shape. In other words, when the document sheets 9 stacked on the document loading table 14 are evaluated as many as 50 sheets (as high as an estimated height H1 of 5 mm) in volume of normal sheets, after the leading end of the top sheet 9 contacts the circumferential surface of the separation roller 20 in the aforementioned contact point S, one or a few sheets 9 including the top sheet 9 are fed in the tangential direction S on the circumferential surface of the separation roller 20. The elastic guide portion 35c is configured to get up from the upper surface of the separation arm 23 with the distal end M thereof in contact with or close to the circumferential surface of the separation roller 20. Therefore, when the leading ends of the plural sheets 9 proceed obliquely downward to the upper surface of the separation arm 23, each of the leading ends of the plural sheets 9 certainly collides against the guide portion 35c. Since a frictional coefficient between the sheets 9 and the surface of the guide portion 35c is low and the guide portion 35c is configured as a whole to be elastic, the guide portion 35c is bent down as the leading ends of the plural sheets 9 proceed. Thus, a gap through which the plural sheets 9 can pass is formed between the distal end M of the guide portion 35c and the circumferential surface of the separation roller 20 (see a double-dashed chain line in FIG. 11A).

The leading ends of the plural sheets 9 are guided in the direction M1 to be closer to the circumferential surface of the separation roller 20. In this situation, the leading end of the top sheet 9 closest to the circumferential surface of the separation roller 20 goes ahead, and the leading ends of the other underlying adjacent sheets 9 go behind, forming a wedge shape in a side view thereof. Consequently, the leading ends of the sheets 9 are smoothly fed to the nipping point N where the circumferential surface of the separation roller 20 contacts the separation arm 23 (see FIG. 11A). Near the nipping point N, owing to frictional resistance from the separation arm 23, the sheets 9 other than the top sheet 9 are prevented from proceeding, and the top sheet 9 is only fed separately from the other sheets 9. Accordingly, these sheets 9 proceed substantially parallel to the upper surface of the separation arm 23, and thus it is possible to prevent the leading ends of the sheets 9 from being reformed in a curled shape in a conventional fashion.

FIGS. 12A and 12B schematically show a configuration of the separation roller 20 attached to the drive shaft 27. The drive shaft 27, which is a metal round bar, includes an attachment hole 41 formed substantially at a center in an axis line direction of the drive shaft 27 with a diameter slightly larger than that of a pin 40 and a depth two thirds as long as the diameter of the drive shaft 27. The attachment hole 41 of the drive shaft 27 is configured to stand the pin 40 in a direction perpendicular to the axis line direction of the drive shaft 27. Further, the drive shaft 27 includes a through hole 42 with a diameter smaller than that of the attachment hole 41. The through hole 42 is formed to follow the attachment hole 41 and penetrate a region of the drive shaft 27 where the attachment hole 41 is not formed. Thus, by forming the attachment hole 41 and the through hole 42 to penetrate the drive shaft 27, when the drive shaft 27 is entirely plated, plating liquid passes through the attachment hole 41 and the through hole 42, and inner circumferential surfaces of the attachment hole 41 and the through hole 42 are plated as well.

Meanwhile, the separation roller 20 includes a ring-shaped canopy 43 integrally formed on one side of the sleeve 20a thereof and an engagement projection 44 integrally formed on an end face of the sleeve 20a at an inner circumferential side relative to the canopy 43. The pin 40 has a length set to be slightly shorter than a distance between a bottom surface of the attachment hole 41 and an inner circumferential surface of the canopy 43 (see FIGS. 12A and 12B). In the state where the drive shaft 27 is inserted into a central hole of the separation roller 20 and an attachment hole of the case 26 and the attachment hole 41 and the through hole 42 are located outside the canopy 43 of the separation roller 20, the pin 40 is fitted in the attachment hole 41. Subsequently, a Ω-shaped snap ring 45 is engaged with an attachment groove provided around the drive shaft 27 at a side across the separation roller 20 from the pin 40 (near a right outside surface of the case 26 in FIG. 12A). In this situation, the separation roller 20 and the case 26 are sandwiched between the pin 40 and the snap ring 45, and thus prevented from being detached from the drive shaft 27 or moving in the axis line direction of the drive shaft 27. Further, even though a centrifugal force acts on the pin 40 through rotation of the drive shaft 27, the canopy 43 prevents the pin 40 from being off the drive shaft 27.

When the drive shaft 27 is rotated in a predetermined direction (clockwise in FIG. 12B) by a drive motor (not shown) and the pin 40 comes into contact with the engagement projection 44, the separation roller 20 is rotated clockwise in FIG. 12B and a feeding operation is started. When a leading end of a document sheet 9 separated is pinched between the feed rollers 15 and a pinch roller (a driven roller) 46 (see FIG. 13) at a downstream side relative to the separation roller 20 in the sheet feeding direction, since a circumferential velocity (a feeding speed) there is slightly higher than that at the separation roller 20, the engagement projection 44 of the separation roller 20 is away in the rotating direction from the pin 40. In this situation, no driving force is transmitted from the drive shaft 27 to the separation roller 20. When a tail end of the sheet 9 completely passes through the nipping point N between the separation roller 20 and the separation arm 23, the separation roller 20 stops rotating once. When the pin 40 of the drive shaft 27 being rotating catches up with the engagement projection 44, the separation roller 20 is again rotated by the driving force from the drive shaft 27. Thus, since the document sheets 9 stacked on the document loading table 14 are fed with an appropriate interval between a precedent sheet and a following sheet, it is possible for the scanner unit 8 of the image scanner 1 to scan the document sheets 9 distinctly on a sheet-by-sheet basis.

Figure 13:
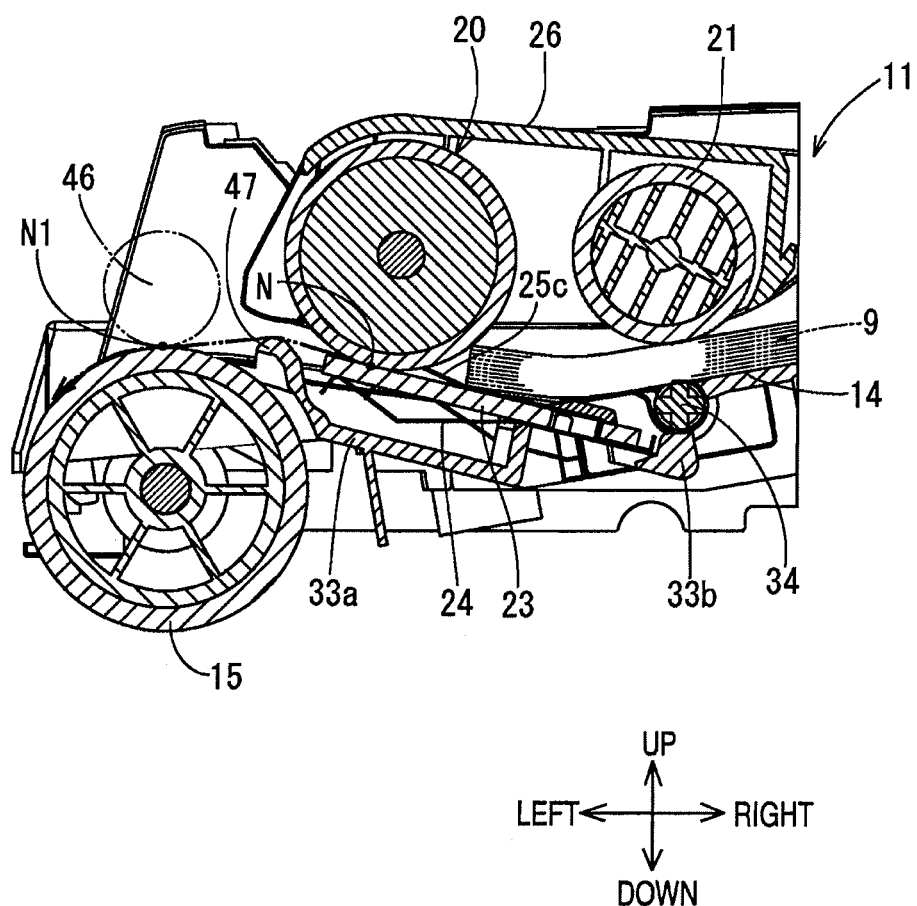
FIG. 13 is a cross-sectional enlarged front view of the separation feed mechanism for illustrating a bank member and a downstream nipping point in the first embodiment according to one or more aspects of the present invention.

In addition, as illustrated in FIG. 13, the support frame 33a is provided integrally with a bank member 47, which is disposed between the nipping point N and a downstream nipping point N1 between the feed rollers 15 and the pinch roller 46 and configured to switch a carrying path of the fed document sheets 9 from an upward path to a downward path. Thereby, it is possible to prevent nipping a sheet 9 between the separation roller 20 and the separation arm 23 from being improperly released by a downward external force, larger than a pressing force by the spring plate 24, which might be applied to the separation arm 23 when a tensile force acts on the sheet 9 between the nipping point N and the downstream nipping point N1.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

In some aspects of the present invention, the pickup roller 21 may not necessarily have to be provided. For example, when the document loading table 14 is tilted at a large angle down to the lower circumferential surface of the separation roller 20, a stack of document sheets 9 placed on the document loading table 14 slides down along the document loading table 14 and automatically establishes contact with the circumferential surface of the separation roller 20.

In some aspects of the present invention, various kinds of material such as metal, other than resin, may be applied to the guide member 25 and the guide portion 25c that are configured to apply lower frictional resistance to a document sheet 9 in contact therewith than the separation arm 23.

Further, the separation feed mechanism 11 in some aspects of the present invention may be applied to a device configured to feed sheets stacked on a feed tray to a printer unit separately on a sheet-by-sheet basis, or to a feeder unit of an automatic counter for banknotes, as well as automatic sheet feeding to the scanner unit 8.

In the aforementioned embodiments, the document feeder 2 is configured to feed the document sheets 9 stacked on the document loading table 14 sequentially in the order from the top sheet of the document sheets 9. However, aspects of the present invention may be applied to a document feeder configured to feed stacked sheets sequentially in the order from a bottom sheet of the stacked sheets.

What is claimed is:

1. A sheet feeder, comprising:
    a document holding table configured to hold a stack of sheets, such that the stack of sheets is fed, one by one, from the holding table along a sheet feeding path, wherein the document holding table is arranged on a first side of the sheet feeder;
    a separation arm comprising a first surface and a second surface opposite to the first surface, wherein the separation arm is arranged on the first side of the sheet feeder;
    a separation roller disposed above the first surface of the separation arm, wherein the separation roller is arranged on a second side of the sheet feeder opposite to the first side of the sheet feeder, and wherein the first side of the sheet feeder is separated from the second side of the sheet feeder by the sheet feeding path;
    an urging member urging the separation arm from the second surface toward the separation roller; and
    a guide member arranged on the first side of the sheet feeder, wherein the guide member comprises an end portion and an intermediate portion, wherein the intermediate portion is provided on the first surface of the separation arm and extends along the first surface of the separation arm, and wherein the end portion is tilted upward from the intermediate portion toward the separation roller,
    wherein the separation arm and the separation roller nip a sheet therebetween at a nipping point,
    wherein the end portion of the guide member is disposed at an upstream side of the nipping point in a sheet feeding direction,
    wherein the guide member extends from underneath the stack of sheets to a downstream side of the stack of sheets in the sheet feeding direction, and
    wherein a frictional coefficient between the guide member and the separation roller is lower than a frictional coefficient between the separation arm and the separation roller.

2. The sheet feeder according to claim 1,
    wherein the end portion and the intermediate portion are disposed within a length of the separation arm in an axial direction of the separation roller.

3. The sheet feeder according to claim 1,
    wherein the end portion of the guide member is configured to be elastically bent and form a gap through which a sheet can pass when the sheet fed by the separation roller comes into contact with the end portion of the guide member.

4. An image scanner, comprising:
    a sheet feeder configured to feed document sheets in a predetermined direction sequentially on a sheet-by-sheet basis; and
    a scanner unit configured to scan images on the document sheets fed by the sheet feeder,
    wherein the sheet feeder comprises:
        a document holding table configured to hold a stack of sheets, such that the stack of sheets is fed, one by one, from the holding table along a sheet feeding path, wherein the document holding table is arranged on a first side of the sheet feeder;
        a separation arm comprising a first surface and a second surface opposite to the first surface, wherein the separation arm is arranged on the first side of the sheet feeder;
        a separation roller disposed above the first surface of the separation arm, wherein the separation roller is arranged on a second side of the sheet feeder opposite to the first side of the sheet feeder, and wherein the first side of the sheet feeder is separated from the second side of the sheet feeder by the sheet feeding path;
        an urging member urging the separation arm from the second surface toward the separation roller; and
        a guide member arranged on the first side of the sheet feeder, wherein the guide member comprises an end portion and an intermediate portion, wherein the intermediate portion is provided on the first surface of the separation arm and extends along the first surface of the separation arm, and wherein the end portion is tilted upward from the intermediate portion toward the separation roller,
    wherein the separation arm and the separation roller nip a sheet therebetween at a nipping point,
    wherein the end portion of the guide member is disposed at an upstream side of the nipping point in a sheet feeding direction,
    wherein the guide member extends from underneath the stack of sheets to a downstream side of the stack of sheets in the sheet feeding direction, and
    wherein a frictional coefficient between the guide member and the separation roller is lower than a frictional coefficient between the separation arm and the separation roller.

5. The image scanner according to claim 4,
    wherein the end portion and the intermediate portion are disposed within a length of the separation arm in an axial direction of the separation roller.

6. The image scanner according to claim 4,
    wherein the end portion of the guide member is configured to be elastically bent and form a gap through which a sheet can pass when the sheet fed by the separation roller comes into contact with the end portion of the guide member.

7. An image printing device, comprising:
    an image scanner that comprises:
        a sheet feeder configured to feed document sheets with images thereon in a predetermined direction sequentially on a sheet-by-sheet basis; and
        a scanner unit configured to scan the images on the document sheets fed by the sheet feeder;

a feed unit configured to feed print sheets; and a printer unit configured to print the images scanned by the scanner unit onto the print sheets fed by the feed unit, wherein the sheet feeder comprises:
- a document holding table configured to hold a stack of sheets, such that the stack of sheets is fed, one by one, from the holding table along a sheet feeding path, wherein the document holding table is arranged on a first side of the sheet feeder;
- a separation arm comprising a first surface and a second surface opposite to the first surface, wherein the separation arm is arranged on the first side of the sheet feeder;
- a separation roller disposed above the first surface of the separation arm, wherein the separation roller is arranged on a second side of the sheet feeder opposite to the first side of the sheet feeder, and wherein the first side of the sheet feeder is separated from the second side of the sheet feeder by the sheet feeding path;
- an urging member urging the separation arm from the second surface toward the separation roller; and
- a guide member arranged on the first side of the sheet feeder, wherein the guide member comprises an end portion and an intermediate portion, wherein the intermediate portion is provided on the first surface of the separation arm and extends along the first surface of the separation arm, and wherein the end portion is tilted upward from the intermediate portion toward the separation roller, wherein the separation arm and the separation roller nip a sheet therebetween at a nipping point, wherein the end portion of the guide member is disposed at an upstream side of the nipping point in a sheet feeding direction, wherein the guide member extends from underneath the stack of sheets to a downstream side of the stack of sheets in the sheet feeding direction, and wherein a frictional coefficient between the guide member and the separation roller is lower than a frictional coefficient between the separation arm and the separation roller.

8. The image printing device according to claim 7, wherein the end portion and the intermediate portion are disposed within a length of the separation arm in an axial direction of the separation roller.

9. The image printing device according to claim 7, wherein the end portion of the guide member is configured to be elastically bent and form a gap through which a sheet can pass when the sheet fed by the separation roller comes into contact with the end portion of the guide member.

* * * * *